US009710699B2

(12) United States Patent
Justice et al.

(10) Patent No.: US 9,710,699 B2
(45) Date of Patent: Jul. 18, 2017

(54) THREE DIMENSIONAL RECOGNITION FROM UNSCRIPTED SOURCES TECHNOLOGY (TRUST)

(71) Applicants: James W Justice, Newport Beach, CA (US); Virgillio Villacorta, Corona, CA (US)

(72) Inventors: James W Justice, Newport Beach, CA (US); Virgillio Villacorta, Corona, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 76 days.

(21) Appl. No.: 14/926,605

(22) Filed: Oct. 29, 2015

(65) Prior Publication Data
US 2016/0125609 A1    May 5, 2016

Related U.S. Application Data

(60) Provisional application No. 62/073,101, filed on Oct. 31, 2014.

(51) Int. Cl.
G06K 9/00         (2006.01)
G06T 1/20         (2006.01)
G06K 9/62         (2006.01)

(52) U.S. Cl.
CPC ..... G06K 9/00302 (2013.01); G06K 9/00288 (2013.01); G06K 9/00986 (2013.01); G06K 9/6255 (2013.01); G06T 1/20 (2013.01)

(58) Field of Classification Search
CPC   G06T 1/20; G06T 15/50; G06T 17/00; G06T 15/00; G06T 15/205; G06T 15/506; G06T 2207/30196; G06K 9/00201; G06K 9/00288; G06K 9/00208; G06K 9/00221; G06K 9/00302; G06K 9/00335; G06K 9/0063

See application file for complete search history.

(56) References Cited

U.S. PATENT DOCUMENTS

| 2004/0181552 | A1* | 9/2004 | Milne | G06K 9/00221 |
| 2004/0190775 | A1* | 9/2004 | Miller | G06K 9/00208 382/190 |
| 2005/0276452 | A1* | 12/2005 | Boland | G06K 9/00288 382/118 |
| 2009/0303247 | A1* | 12/2009 | Zhang | G06T 15/20 345/594 |

(Continued)

Primary Examiner — Jingge Wu

(57) ABSTRACT

The invention is a device and method for recognizing individuals of interest by analyzing images taken under real world lighting conditions with imperfect viewing. Recognition attributes are identified by running a plurality of processing algorithms on the image data which a) extract indices of recognition that are markers relating to specific individuals, b) create morphable, three dimensional computer graphics models of candidate individuals based on the indices of recognition, c) apply the viewing conditions from the real world data imagery to the three dimensional models, and d) declare recognition based on a high degree of correlation between the morphed model and the raw data image within a catalog of the indices of recognition of individuals of interest. The invention further encompasses the instantiation of the processing on very high thruput processing elements that may include FPGAs or GPUs.

6 Claims, 2 Drawing Sheets

(56) References Cited

U.S. PATENT DOCUMENTS

| | | | | |
|---|---|---|---|---|
| 2011/0157314 A1* | 6/2011 | Kurino | ................. | G06T 15/506 |
| | | | | 348/46 |
| 2014/0176535 A1* | 6/2014 | Krig | ....................... | G06T 15/04 |
| | | | | 345/419 |
| 2015/0359462 A1* | 12/2015 | Laan | ....................... | A41H 1/02 |
| | | | | 348/47 |

* cited by examiner

Figure 1, TRUST Architecture
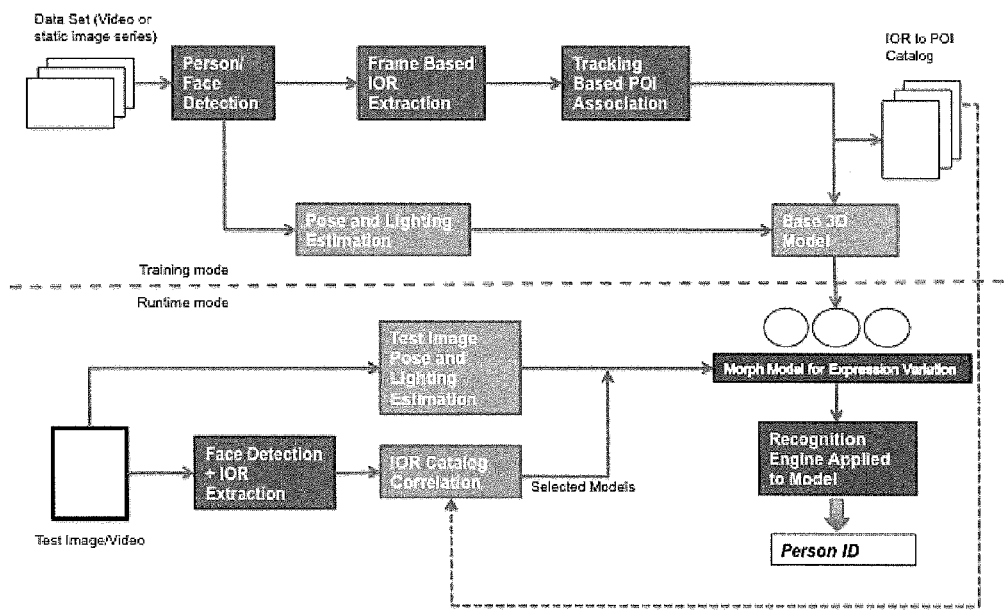

Figure 2. Multi-GPU High Thruput Processor for Hosting TRUST Processing
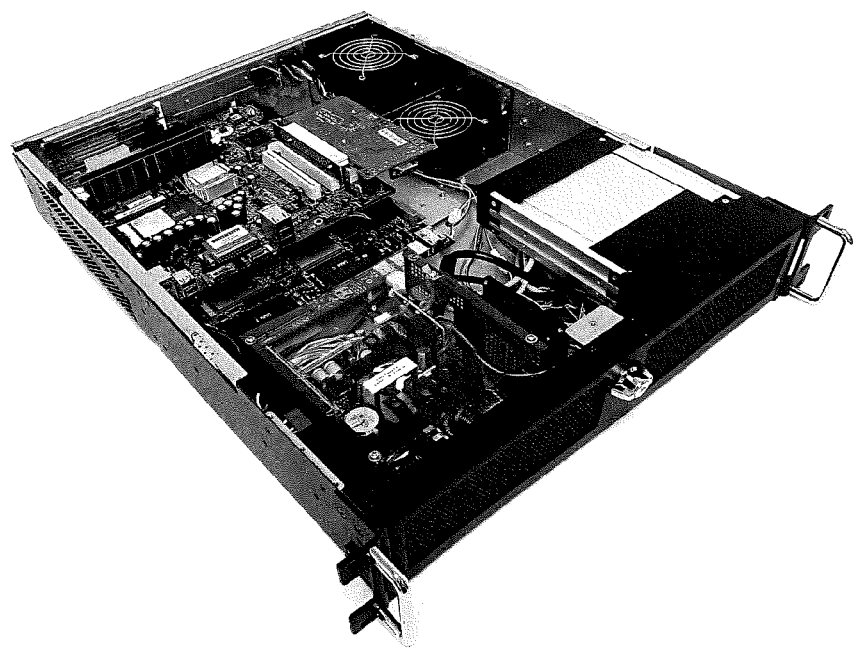

THREE DIMENSIONAL RECOGNITION FROM UNSCRIPTED SOURCES TECHNOLOGY (TRUST)

CROSS-REFERENCE TO RELATED APPLICATIONS

This application claims the benefit of U.S. Provisional Patent Application No. 62/073,101, filed on Oct. 31, 2014 entitled "Three Dimensional Recognition from Unscripted Sources Technology (TRUST)" pursuant to 35 USC 119, which application is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention relates generally to the field of image processing instantiated on efficient processor hardwares. More specifically, the invention relates to a device and method for recognizing individuals of interest by analyzing image data taken under real world lighting conditions and with imperfect viewing.

2. Description of the Related Art

Recognition of individuals, today, is performed by comparison of front-on, uniformly illuminated images in large data bases of individuals of interest with a similar image of the individual to be recognized. This technique fails when the image of the person to be recognized is not front-on and not uniformly illuminated. What is needed is a technique and approach that can perform recognition of individuals when the image input is not face-on and not uniformly illuminated as typically produced by images obtained under real-world, or "Wild", conditions. Such a technique can then take advantage of the growing data bases of images taken under real-world conditions often residing on the internet or in social media. Such data is often referred to as "wild data" in the sense that the image is not posed and lighting conditions are natural and not created by lighting apparatus whose purpose is to create uniform illumination.

BRIEF SUMMARY OF THE INVENTION

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The invention is a device and method for recognizing individuals of interest by analyzing images taken under real world lighting conditions with imperfect viewing. Recognition attributes are identified by running a plurality of processing algorithms on the image data which a) extract indices of recognition that are markers relating to specific individuals, b) create morphable, three dimensional computer graphics models of candidate individuals based on the indices of recognition, c) apply the viewing conditions from the real world data imagery to the three dimensional models, and d) declare recognition based on a high degree of correlation between the morphed model and the raw data image within a catalog of the indices of recognition of individuals of interest. The invention further encompasses the instantiation of the processing on very high thruput processing elements that may include FPGAs or GPUs.

BRIEF DESCRIPTION OF THE SEVERAL VIEWS OF THE DRAWINGS

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

FIGS. 1 and 2 and the description of the preferred embodiments which are presented are illustrated examples of the invention in any subsequent claims in any application claiming priority to this application. FIG. 1 presents the TRUST Processing Architecture that a) implements the determination of indices of recognition of persons in the data base, b) the analysis of pose and lighting conditions from the natural, or "wild" data source, c) the generation of the 3D graphics, morphed model with imposed lighting conditions derived from the wild image, d) rendering of a 2D image from the 3D morphed, posed, and illuminated model representing the angle of viewing in the original "wild" data image, and e) determining recognition based on the highest degree of correlation between the set of candidate members from the data base of individuals of interest rendered into the frame of reference of the "wild" data image. FIG. 2 presents a candidate, multi-GPU processing platform for the instantiation of the TRUST processing architecture.

DETAILED DESCRIPTION OF THE INVENTION

Turning now to the figures wherein like numerals define like elements among the several views, the Three Dimensional Recognition from Unscripted Sources Technology (TRUST) capability is an innovative integration of advanced technologies and tools operating together to achieve a new method of recognizing individuals of interest. The innovative claims embodied in the approach are listed in below.

The first innovation is the idea of characterizing a Person of Interest (POI) by a set of biometric Indices of Recognition (IORs) which cover inherent features and how they may vary with pose, illumination, age, and state of emotion. IORs are used for the archiving of information on an individual basis thus limiting storage requirements. The more indices that are accumulated on an individual of interest the higher the probability of correct identification from subsequent wild data samples.

The second innovative feature of the approach is the use of modern image analysis tools to determine lighting condition, pose, and expression information from wild images or video sequences. This will provide critical information enabling deeper understanding of the imagery and extraction of IORs on individuals to be identified by the application.

The third innovative feature of the approach is to build a capability to use modern 3D graphic arts to fashion morphable models of individuals based on their IOR set and based upon wild image derived lighting, pose, and expression data. (This is not used in the final recognition step).

The set of IORs derived from the wild image is used to identify candidate individuals within the database whose IORs have an acceptable degree of correlation. This correlation and data set selection is based upon an innovative Bayesian Inference Modeling Correlation technique.

3D models derived from the Indices of Recognition of candidate individuals with high correlation to the wild data are then transformed to match the lighting and pose from the wild image(s) of the individual to be identified. The 3D model is used as an "intermediate tool" to render a 2D view of the candidate subjects with lighting, pose, and expression matching that in the wild data image for use in the final recognition determination. Such models are used for capturing "ageing" effects.

The morphed 3D models representing those individuals with a degree of correlation in their IORs and shown in the illumination levels and pose derived from the of the wild data sample(s) are then compared to the wild data itself using the next innovation—a Recognition Engine based on fundamental biometrics, such as the NIST Biometric data base, and upon fundamental neuroscience-based cognitive recognition models.

Another innovation of this approach is the ability to continuously update the IORs of individuals in the data set as added or collateral data are available and analyzed.

Finally, the innovative software architecture and processing approach enable TRUST to be implemented on a very time and cost effective multi-GPU processing appliance.

The integration of these capabilities into the TRUST processing architecture is illustrated in FIG. 1 and a candidate multi-GPU processors is illustrated in FIG. 2.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub combination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. An image processing appliance comprising a family of image processing functions instantiated on high thru put processor hardwares that accomplishes recognition of individuals of interest from analysis of images taken under real world lighting conditions, wherein the analysis functions accomplish a) extraction of indices of recognition from real work imagery sets containing the images of the individuals of interest, b) the construction of three dimensional morphable models of the individuals of interest based on data sets containing images of the individuals of interest, c) extraction of lighting conditions from the real world image data set containing images of the individual to be recognized, d) imposition of the extracted lighting conditions upon the three dimensional images of candidate individuals, and e) declaration of individual identify based on a high degree of correlation between the real world data set and the simulated data set extracted from the morphed three dimensional models with the lighting conditions of the real image rendered onto the three dimensional models morphed into the positional conditions of the individual to be recognized from the real world data set.

2. The extraction of indices of recognition of claim 1 accomplished upon historical data sets known to contain the real world images of the individual of interest.

3. The development of morphable, three dimensional models of potential individuals of interest of claim 1 based upon the full set of indices of recognition derived for that individual and has the capability for representing expression variations and age variations.

4. The extraction of lighting conditions of claim 1 performed upon the real world image data set that is to serve as the basis of the individual of interest recognition.

5. The declaration of recognition of claim 1 performed by computing the degree of correlation between the real world image data set and the data set produced by transforming the three morphed model of candidate individuals with correct pose and lighting and selecting the individual in the data base with sufficiently high or highest degree of correlation between the real worked data and the simulated data.

6. The host processing hardwares of claim 1 asFPGA-based, GPU-based, or analog ASIC-based processing units.

* * * * *